US 8,234,679 B2

(12) United States Patent
Lawrence-Apfelbaum (10) Patent No.: US 8,234,679 B2
(45) Date of Patent: Jul. 31, 2012

(54) TECHNIQUE FOR SELECTING MULTIPLE ENTERTAINMENT PROGRAMS TO BE PROVIDED OVER A COMMUNICATION NETWORK (75) Inventor: Marc J. Lawrence-Apfelbaum, New York, NY (US)

(73) Assignee: Time Warner Cable, Inc., Stamford, CT (US)

( * ) Notice: Subject to any disclaimer, the term of this patent is extended or adjusted under 35 U.S.C. 154(b) by 781 days.

(21) Appl. No.: 11/097,563

(22) Filed: Apr. 1, 2005

(65) Prior Publication Data

US 2006/0225097 A1   Oct. 5, 2006

(51) Int. Cl.
H04N 7/173   (2006.01)

(52) U.S. Cl. ............... 725/86; 725/37; 725/40; 725/44; 725/45; 725/46; 725/47; 725/87; 725/88; 725/101; 725/102

(58) Field of Classification Search ............... 725/8–104
See application file for complete search history.

(56) References Cited

U.S. PATENT DOCUMENTS

| | | | |
|---|---|---|---|
| 5,285,272 A | 2/1994 | Bradley et al. | |
| 5,377,051 A | 12/1994 | Lane et al. | |
| 5,477,263 A | 12/1995 | O'Callaghan et al. | |
| 5,479,303 A | 12/1995 | Suzuki et al. | |
| 5,517,257 A | 5/1996 | Dunn et al. | |
| 5,528,282 A | 6/1996 | Voeten et al. | |
| 5,606,359 A | 2/1997 | Youden et al. | |
| 5,710,970 A | 1/1998 | Walters et al. | |
| 5,721,878 A | 2/1998 | Ottesen et al. | |
| 5,771,335 A | 6/1998 | Lee | |
| 5,805,762 A | 9/1998 | Boyce et al. | |
| 5,805,763 A | 9/1998 | Lawler et al. | |
| 6,020,883 A | 2/2000 | Herz et al. | |
| 6,028,603 A | 2/2000 | Wang et al. | |
| 6,061,056 A | 5/2000 | Menard et al. | |
| 6,065,050 A | 5/2000 | DeMoney | |
| 6,097,389 A | 8/2000 | Morris et al. | |
| 6,202,061 B1 | 3/2001 | Khosla et al. | |
| 6,233,389 B1 | 5/2001 | Barton et al. | |
| 6,253,375 B1 | 6/2001 | Gordon et al. | |
| 6,263,507 B1 | 7/2001 | Ahmad et al. | |
| 6,378,130 B1 | 4/2002 | Adams | |
| 6,389,218 B2 | 5/2002 | Gordon et al. | |
| 6,446,080 B1 * | 9/2002 | Van Ryzin et al. | ........ 707/104.1 |
| 6,452,609 B1 | 9/2002 | Katinsky et al. | |
| 6,484,156 B1 | 11/2002 | Gupta et al. | |
| 6,510,554 B1 | 1/2003 | Gordon et al. | |
| 6,532,593 B1 | 3/2003 | Moroney | |
| 6,543,053 B1 | 4/2003 | Li et al. | |
| 6,609,253 B1 | 8/2003 | Swix et al. | |
| 6,615,248 B1 | 9/2003 | Smith | |
| 6,668,377 B1 * | 12/2003 | Dunn | ............... 725/92 |

(Continued)

Primary Examiner — Pankaj Kumar
Assistant Examiner — Alazar Tilahun
(74) Attorney, Agent, or Firm — Straub & Pokotylo; Michael P. Straub; Stephen T. Straub (57) ABSTRACT In an entertainment service providing on-demand programs over a broadband communications network, a user is allowed to view multiple programs in a continuous manner. The user's enjoyment of the entertainment service is enhanced especially when the on-demand programs are short, e.g., on-demand music videos which typically are a few minutes long. The user is provided with graphical user interfaces for selecting the desired programs to watch, and also allowed to determine the order in which the selected programs are to be played, which may be random.

41 Claims, 4 Drawing Sheets

U.S. PATENT DOCUMENTS

| | | |
|---|---|---|
| 6,731,312 B2 | 5/2004 | Robbin |
| 6,904,004 B1 * | 6/2005 | Van der Meulen ........ 369/30.28 |
| 7,024,678 B2 | 4/2006 | Gordon et al. |
| 7,222,163 B1 | 5/2007 | Girouard et al. |
| 7,243,140 B2 * | 7/2007 | Gupta et al. .................. 709/219 |
| 2002/0016970 A1 | 2/2002 | Negishi et al. |
| 2002/0131428 A1 | 9/2002 | Pecus et al. |
| 2002/0174438 A1 | 11/2002 | Cleary et al. |
| 2002/0199188 A1 * | 12/2002 | Sie et al. ......................... 725/35 |
| 2003/0093800 A1 | 5/2003 | Demas et al. |
| 2003/0101230 A1 | 5/2003 | Benschoter et al. |
| 2003/0149988 A1 | 8/2003 | Ellis et al. |
| 2003/0182315 A1 * | 9/2003 | Plastina et al. ................ 707/200 |
| 2003/0208767 A1 | 11/2003 | Williamson et al. |
| 2004/0117831 A1 * | 6/2004 | Ellis et al. ....................... 725/53 |
| 2005/0160458 A1 * | 7/2005 | Baumgartner .................. 725/46 |
| 2006/0112335 A1 * | 5/2006 | Hofmeister et al. ........... 715/701 |
| 2006/0140091 A1 * | 6/2006 | Iwamoto et al. .............. 369/53.2 |
| 2006/0179078 A1 * | 8/2006 | McLean .................... 707/104.1 |

* cited by examiner

TECHNIQUE FOR SELECTING MULTIPLE ENTERTAINMENT PROGRAMS TO BE PROVIDED OVER A COMMUNICATION NETWORK

FIELD OF THE INVENTION

The invention relates generally to a communications system and method and, more particularly, to a system and method for providing programming content on demand through a communications network, such as a cable TV network.

BACKGROUND OF THE INVENTION

Broadcast of entertainment programming content, such as TV programs, over broadband communications networks, such as cable TV networks, is well known. As a matter of fact, the amount of programming content delivered over such networks is ever increasing. At the same time, the number and types of cable services, such as video on demand ("VOD"), movie on demand ("MOD"), subscription VOD ("SVOD"), music on demand ("MuOD), free on demand ("FOD") and pay per view ("PPV"), etc., introduced to enhance a user's program enjoyment, are ever growing.

An on-demand service user at a set-top terminal typically navigates through a series of selection menus displayed on a television screen to locate and request a desired program. Each selection menu typically has different selection links. The selection links may be provided to the set-top terminal by a cable system offering the on-demand services, e.g., via a broadcast file system (BFS) server carousel. The carousel may continuously and serially provide files containing selection links for all the available services provided by the cable system. The set-top terminal may retrieve the appropriate files from the carousel after a service is selected by a user.

SUMMARY OF THE INVENTION

The invention is premised upon the recognition that although use of the prior art BFS server carousel is effective in providing selection links to on-demand programs, it sometimes proves to be cumbersome to access a sequence of on-demand programs using the selection links, especially when the programs are short, such as on-demand music videos. In prior art, in order to enjoy a sequence of on-demand programs, each time after a program is played, a user needs to revisit the selection menu and select the appropriate selection link to access the next program that the user has in mind. That is, the enjoyment of the sequence of programs is undesirably interrupted by intermediate selections, let alone the user's ability to remember each program that the user originally has in mind for the sequence. In accordance with the invention, to allow a user to enjoy continuously a sequence of on-demand programs, a service is provided whereby the user may compile a playlist containing multiple on-demand program selections. Based on the playlist, a server plays the selected programs therein sequentially, free from selection interruptions between programs as in the prior art.

Thus, in accordance with the invention, a user may select a plurality of on-demand programs to be received from a communications network, and initiate a request for playing, in a continuous manner, the selected on-demand programs. The request includes information identifying the respective selected on-demand programs. In response to such a request, a server provides, over the communications network, a communications stream containing the selected on-demand programs in a sequence. The order of the programs in the sequence can be determined by the user, which may be a random order.

BRIEF DESCRIPTION OF THE DRAWING

Further objects, features and advantages of the invention will become apparent from the following detailed description taken in conjunction with the accompanying drawings showing illustrative embodiments of the invention, in which.

DETAILED DESCRIPTION

The invention is directed to providing over a communications network, e.g., a broadband network, an entertainment service whereby a user may compile a playlist containing multiple on-demand program selections. Based on the playlist, a server plays the selected programs therein sequentially, free from selection interruptions between programs as in prior art. The invention is particularly advantageous for continuous enjoyment of a sequence of on-demand programs, which are relatively short, e.g., on-demand music videos which typically are a few minutes long. The order in which the programs are to be played can be determined by the user generating the playlist, which may be random.

Figures 1, 2:
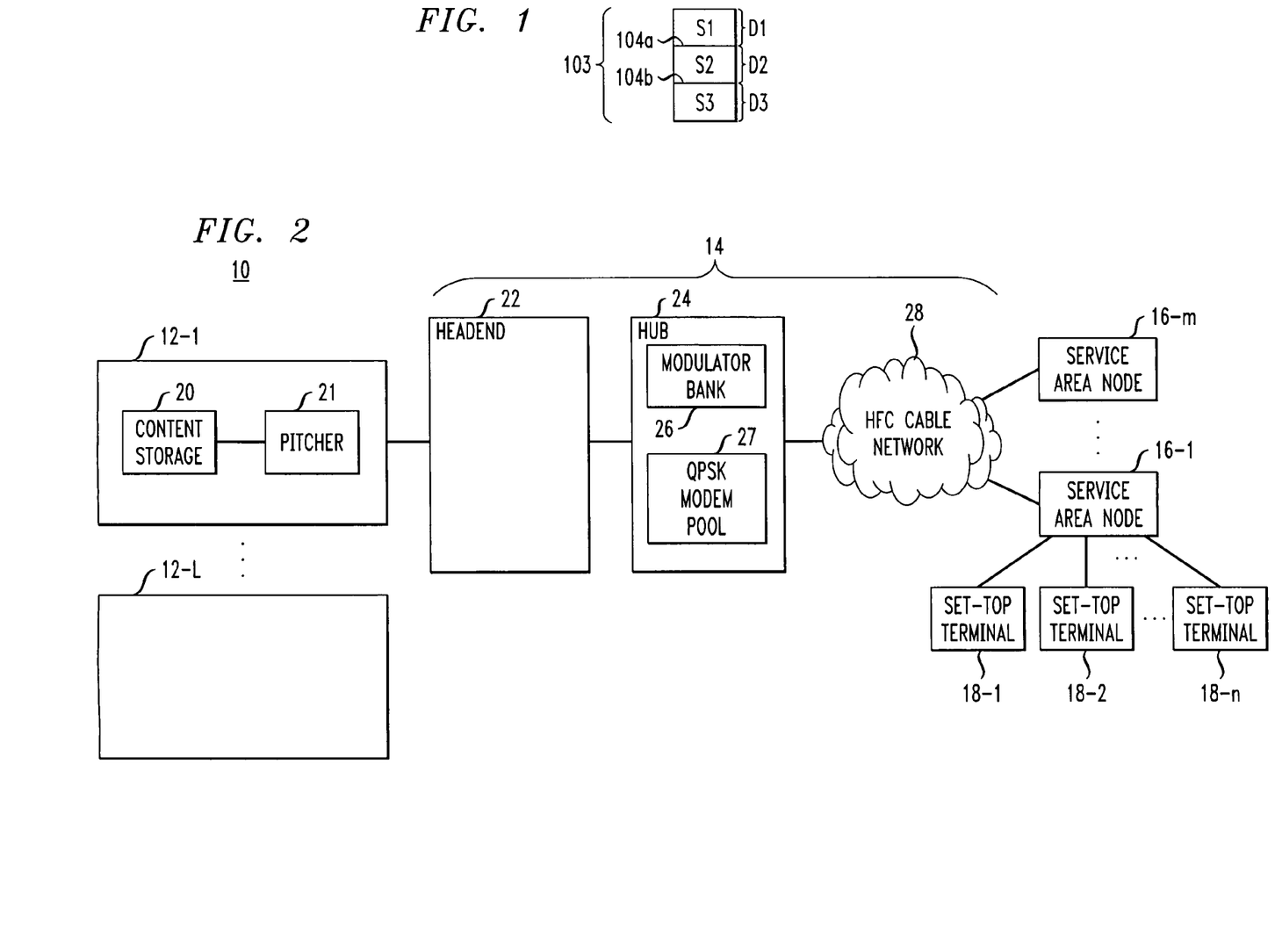
FIG. 1 illustrates a playlist in accordance with the invention.
FIG. 2 is a block diagram of certain components of a broadband communications system including a cable system.

FIG. 1 illustrates conceptually a playlist in accordance with the invention which in this instance contains three on-demand programs selected by a user, denoted S1, S2 and S3 to be played by a VOD server in that order. Programs S1, S2 and S3 may have different durations denoted D1, D2 and D3, respectively. As is well known, these programs may be indexed by their respective normal play times (NPTs) to effectuate rewinding, pausing, fast-forwarding and other trick mode functions normally afforded by a VOD server. In one embodiment of the invention, the programs on a playlist (S1, S2, S3) are regarded as individual programs. Each program may contain one or more tags (or cues) for "chapterizing" the same so that a user may access selected chapters or portions of the program efficiently. Conversely, by taking advantage of the chapterization, a user may skip certain chapters of a program, or even the entire program when reviewing the programs on a playlist. In another embodiment of the invention, the programs on a playlist are regarded as a composite program, e.g., 103, and the boundaries between the individual programs, e.g., 104a and 104b, are merely artificial. By indexing the composite program not only by the NPT of an individual program but also by an asset ID identifying the individual program, e.g., in the format (ID, NPT), the VOD server may perform trick mode functions on composite program 103 as if it were a single program.

FIG. 2 is a block diagram of certain components of a broadband communications system 10 embodying the principles of the invention. The system includes one or more program sources 12-1 through 12-L, where L represents an integer, a cable system 14 and a plurality of service area nodes 16-1 through 16-m in a neighborhood, where m represents an integer. Service area nodes 16-1 through 16-m are coupled to set-top terminals that are coupled to users' televisions ("TVs"). Service area node 16-1, for example, is coupled to set-top terminals 18-1 through 18-n, where n represents an integer. Cable system 14 delivers information and entertainment services to users' TVs, for example, via the set-top terminals 18-1 through 18-n. Service area nodes 16-1 through 16-m and/or set-top terminals 18-1 through 18-n may or may not be part of the cable system 14. The broadband communications system 10 may be configured to operate in accordance with the well known Interactive Service Architecture ("ISA") developed by Time Warner Cable, Inc., Stamford, Conn., for example.

Sources 12-1 through 12-L create programming in manners known in the art, store the programming in content storage 20 and broadcast or "pitch" the programming to cable system 14 through a pitcher 21, for example. A pitcher is a transmitter in an Asset Distribution Interface ("ADI") distribution path in the ISA, as described in VOD MD-SP-VOD—Content Specification I01-020327, Mar. 27, 2003 and VOD Content Specification MD-SP-ADI 1-1-102-030415, Apr. 15, 2003, for example, which are incorporated by reference herein. The programming provided to an on-demand system may include music videos, movies and previously broadcast television shows, for example. In this example, the sources 12-1 through 12-L format the programming in ADI format for transmission by the pitcher 21.

The sources 12-1 through 12-L include analog and digital satellite sources, such as HBO, Turner Broadcasting System and MTV, for example, which typically provide the traditional forms of television broadcast programs and information services. The sources 12-1 through 12-L may also include satellite on-demand sources, such as Music On Demand (MuOD). The sources 12-1 through 12-L also include terrestrial broadcasters, such as broadcast networks, including, e.g., CBS, NBC, ABC, etc. Although specific examples of programs and services that may be provided by the aforementioned sources are given herein, other programs and services may also be provided by these or other sources without departing from the spirit and scope of the invention.

In addition to providing program content, any or all of the sources 12-1 through 12-L may provide navigation video segments comprising media rich graphics such as video, music, audio voiceover, animated text, etc. to the cable system 14 via the pitcher 21. The navigation video segments are provided to set-top terminals, such as set-top terminal 18-1, to be associated with selection links also provided to the set-top terminal 18-1, to form selection menus.

Figure 3:
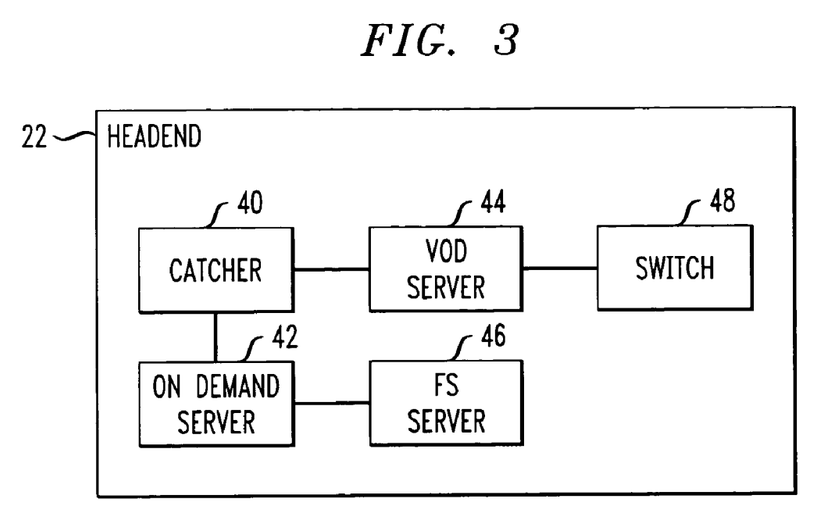
FIG. 3 is a block diagram of certain components of the headend of the cable system of FIG. 1.

The cable system 14 comprises a headend 22, a hub 24 and a hybrid fiber coaxial ("HFC") cable network 28. Assets pitched by the sources 12-1 through 12-L are processed in a conventional manner by the headend 22 and stored. FIG. 3 is a block diagram of certain of the components of the headend 22 that are relevant to the embodiments of the invention. The headend 22 includes, in part, a catcher 40, which is a receiver in the ADI distribution path, an on-demand server 42, a VOD server 44 and a file system ("FS") server 46. The catcher 40 receives the on-demand program content, including on-demand navigation video segments and metadata providing information about the content, "pitched" by the pitcher 21 of the sources 12-1 through 12-1. The catcher 40 then notifies the on-demand server 42 of the identity of the received content, based on metadata associated with the content. The content may be processed by the headend 22 into assets for storage by the VOD server 44. An "asset" is an aggregation of video and audio. Metadata describing the content of one or more assets is combined with one or more assets into "packages." Assets may contain the content or references to the content, which may be stored as another asset. The VOD Server 44 may comprise one or more types of data storage known in the art, such as a relational database, an object oriented database, a hybrid object-relational database, or simply as files in a video optimized or typical file system known in the art.

The on-demand server 42 prepares files based on the metadata associated with the received assets, referred to as catalogs, which are stored on the FS server 46. The catalogs contain information for use by the set-top terminals 18-1 through 18-n, such as electronic program guide information, formatting information selection links for user navigation and/or descriptive material related to the selection links, for example. The FS server 46 allows set-top terminals 18-1 through 18-n to read/acquire the files or catalogs from a broadcast stream as if they were local catalogs. In general, the FS server 46 is used to "trickle," or disseminate piecemeal, catalogs to the set-top terminals 18-1 through 18-n. To that end, the FS server 46 applies a well known "data carousel" mechanism to periodically provide navigation catalogs onto the broadcast stream to the set-top terminals 18-1 through 18-n. The set-top terminals 18-1 through 18-n retrieve the navigation catalogs associated with a selected on-demand service from the carousel. The FS server 46 may operate in accordance with a Broadcast File System (BFS) or an Open Cable Applications Platform (OCAP) Protocol, which are well known in the art. Catalogs may also be provided via an Internet protocol (IP) request/response gateway (not shown).

A program available on demand and requested by a user is transmitted as a data stream through a transmission channel having a specified frequency band. It should be noted that the term "transmission channel" should not be confused with a "program channel." A "transmission channel" signifies a designated frequency band through which a data stream is transmitted. On the other hand, a "program channel" signifies the source of the program material selected by a user to view. For example, a user may select program channel 2 to view program material provided by CBS, program channel 14 to view program material provided by ESPN, program channel 55 to view program material provided by MuOD, etc. In this illustrative embodiment, the transmission channels may be 6 MHz bands populating a forward passband, e.g., 350-750 MHz band, of a coaxial cable, which is allocated for downstream communication from headend 22 to a set-top terminal 18-1 through 18-n.

Returning to FIG. 2, the FS carousel and program signal data streams of the requested programs are typically transmitted from the headend 22 to the hub 24 via Internet protocol ("IP") transport over optical fiber. The program signal streams may also be transmitted as intermediate frequency signals that have been amplitude modulated ("AM") or as a digital video broadcast (DVB) asynchronous serial interface (ASI) that has also been AM modulated. The hub 24 includes a modulator bank 26 and a quaternary phase shift keying ("QPSK") modem pool 27, among other components. The modulator bank 26 includes multiple modulators, each of which is used to modulate data streams comprising the carousel and program assets onto different carriers. By using a 256-quadrature-amplitude-modulation (256-QAM) technique and 6 MHz transmission channel, each modulator in the modulator bank 26 in this instance may modulate up to 9 data streams, multiplexed in a transport stream, onto the corresponding carrier. The resulting modulated carrier is transmitted through the transmission channel associated with the carrier. The on-demand server 42 causes switching unit 48 to switch the data stream containing a requested program to appropriate modulators in the modulation bank 26. The modulated carrier traverses the transmission channel associated therewith in HFC cable network 28.

The QPSK modem pool 27 modulates data streams onto out-of-band channels. Communications from the set-top terminals 18-1 through 18-n to the headend 22 may be conveyed via a reverse passband of 5-40 MHz band of a coaxial cable, for example. The reverse passband comprises reverse data channels ("RDCs") having a 1 MHz bandwidth, for example, through which QPSK signals containing the data are transmitted.

Certain communications from the headend 22 to the set-top terminals 18-1 through 18-L may also be conveyed via out of band, forward data channels ("FDCs"), through the QPSK modem pool 27. FDCs may occupy the 70-130 MHz band of a coaxial cable, for example. QPSK signals containing system messages to a set-top terminal 18-1 through 18-L may be transmitted through an FDC having a 1 MHz bandwidth, for example.

Available programs are stored as assets in the headend 22, such as in the VOD server 44, so that the users at the set-top terminals 18-1 through 18-n may request programming on-demand and manipulate (e.g., pause, fast-forward or rewind) the programming content in the recorded streams. Program manipulation is described in co-pending, commonly assigned application Ser. No. 10/263,015 ("the'015 application"), filed Oct. 2, 2002, for example, which was published on Nov. 6, 2003 bearing U.S. Patent Publication No. 2003-0208767 A1 and which is incorporated by reference herein.

Figure 4:
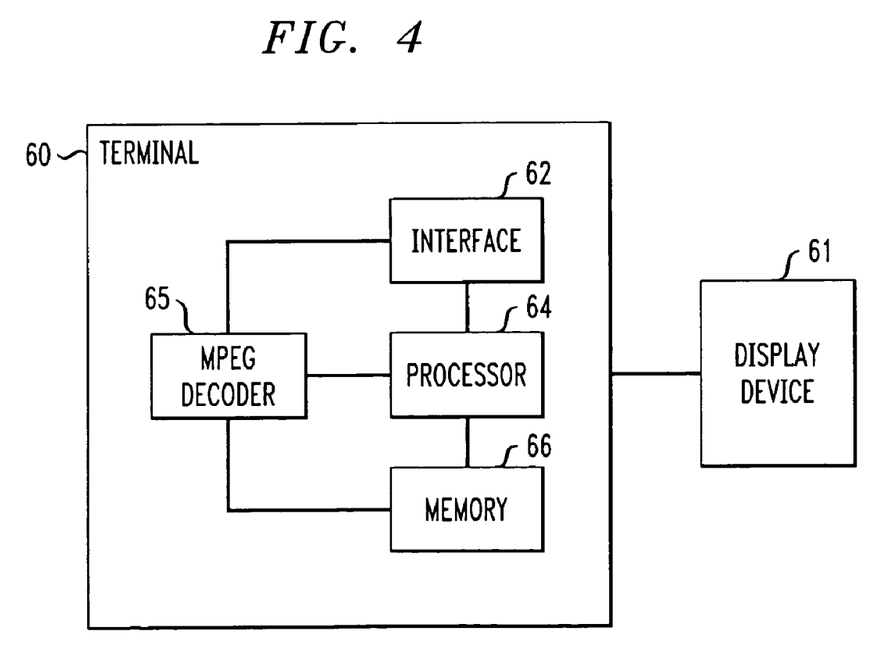
FIG. 4 illustrates a terminal, which is representative of one of the set-top terminals of FIG. 1.

FIG. 4 is an example of a terminal 60, which is representative of one of the set-top terminals 18-1 through 18-n of FIG. 2. The terminal 60 is typically coupled to a display device 61, such as a television, at a user location. The terminal 60 comprises, in part, an interface 62, a processor 64, an MPEG decoder 65 and memory 66. A program signal stream broadcast by the headend 22 is received by the interface, decoded by the MPEG decoder 65 and provided to the display device 61. The memory may be hard drive of the terminal, for example. The terminal is hardware or software that acts as an interface between a display device, such as a TV, and cable system 14 or other such communications system, and controls operation of the display device 61. The terminal may be separate from and coupled to the display device 61, or may be part of or include the display device. The use of the terms "terminal" and "set-top terminal" encompasses devices also referred to as set-top boxes and clients, including, e.g., next generation cable-ready digital TVs or other audiovisual devices which may be OCAP compliant.

During operation, a user operating a terminal, such as the set-top terminal 18-1 coupled to the display device 61, such as a TV, selects an on-demand service, such as MuOD, by selecting an appropriate channel on the terminal. The selection is typically made via a hand operated interface device, such as a remote control (not shown). The terminal requests that a session be established with the headend 22, based on the service selected by the user via the set-top terminal 18-1. A session is established with the headend 22 in accordance with a session set up protocol ("SSP"), for example, as is known in the art. The on-demand server 42 configures the VOD server 44 to allocate bandwidth to communicate with the terminal 18-1.

Navigation video segments to be used in conjunction with selection menus for user navigation are provided over the allocated bandwidth. The on-demand server 42 informs the set-top terminal 18-1 of the frequency of the allocated bandwidth, via an out-of-band, FDC channel, so that the terminal can tune to that frequency to receive, e.g., the navigation video segments. This process is referred to as establishing a "session."

In the meantime, the set-top terminal 18-1 retrieves the appropriate navigation catalogs for the selected on-demand service from the carousel of the FS Server 46. The navigation catalogs for all the services available through the cable system 14 providing selection menus are provided on the carousel via an FDC channel. In one example, the set-top terminal 18-1 acquires a code or descriptor for the navigation catalogs for the selected service from a service table entry for the selected service, enabling the appropriate catalogs to be retrieved from the carousel. The set-top terminal 18-1 stores the retrieved navigation catalogs in the memory 66. The set-top terminal 18-1 constructs selection menus for the user to navigate to a desired program, based on selection links provided in the navigation catalogs.

Figure 5:
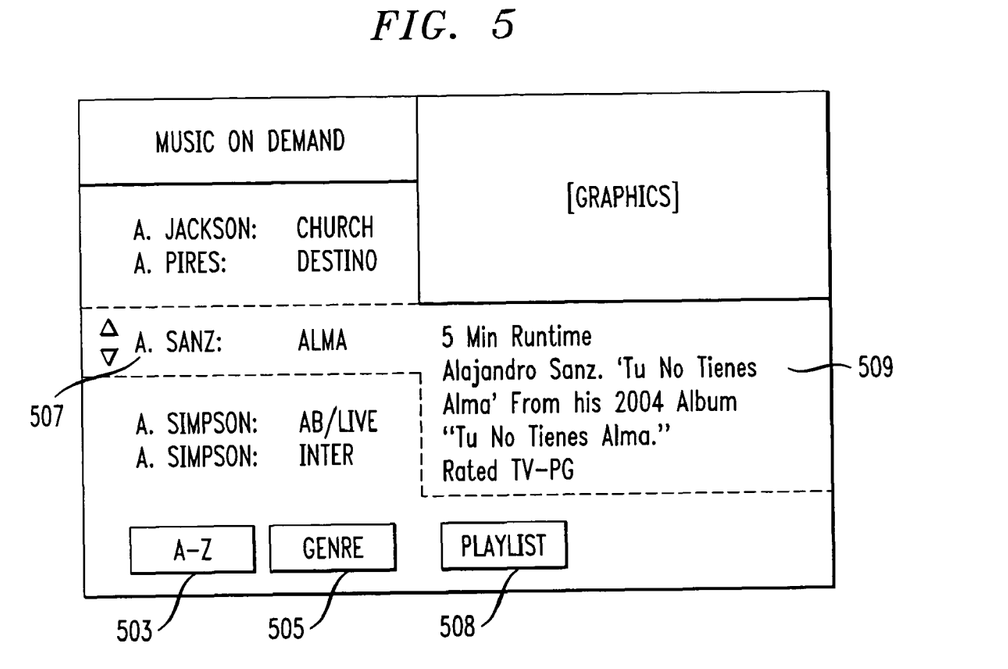
FIG. 5 illustrates a Music On Demand selection menu, in accordance with an embodiment of the invention.

FIG. 5 illustrates a MuOD selection menu including links to different on-demand music videos after a user selects the MuOD channel. These links illustratively are listed alphabetically by artists' names because in this instance option "A-Z" 503 has been selected, e.g., using a remote control. Of course, they may be listed in other formats, e.g., by artist, or by genre (classic, pop, hard rock, country, gospel, etc.) if the "Genre" option 505 is selected. By utilizing the up/down scroll keys on the remote control, a user may navigate through the selection menu and highlight individual music video selection links. For example, when the music video selection link "A. Sanz: Alma" 507 is highlighted, a textual description 509 associated with the link is also displayed, which includes its runtime, the name of the album from which the song originated, its rating, etc. As in prior art, the user in this instance may press a "Select" key on the remote control if he/she desires to select link 507 to play the corresponding music video. However, in accordance with the invention, the user may want to compile a playlist containing multiple programs to be played without interruptions. To that end, a "Playlist" option 508 is provided, a selection of which causes a "Playlist" screen in FIG. 6 to be displayed, with the highlighted music video selection placed in playlist 603, which is "A. Sanz: Alma" in this instance.

To compile the playlist, the user may return to the selection menu of FIG. 5 by selecting "Return to Selection Menu" option 605 to add another on-demand music video selection to the playlist. The playlist can be filled as much as the user desires, e.g., up to a predetermined limit, by toggling between the selection menu of FIG. 5 and the Playlist screen of FIG. 6. After inputting a number of music video selections on playlist 603, a user may exercise Edit option 609 on the Playlist screen to edit the list. For example, in an edit mode, a user may utilize up/down scroll keys on the remote control to navigate through playlist 603 and highlight individual selections on the list. For example, by pressing a predetermined key on the remote control, the user may delete a highlighted selection from playlist 603.

Figure 6:
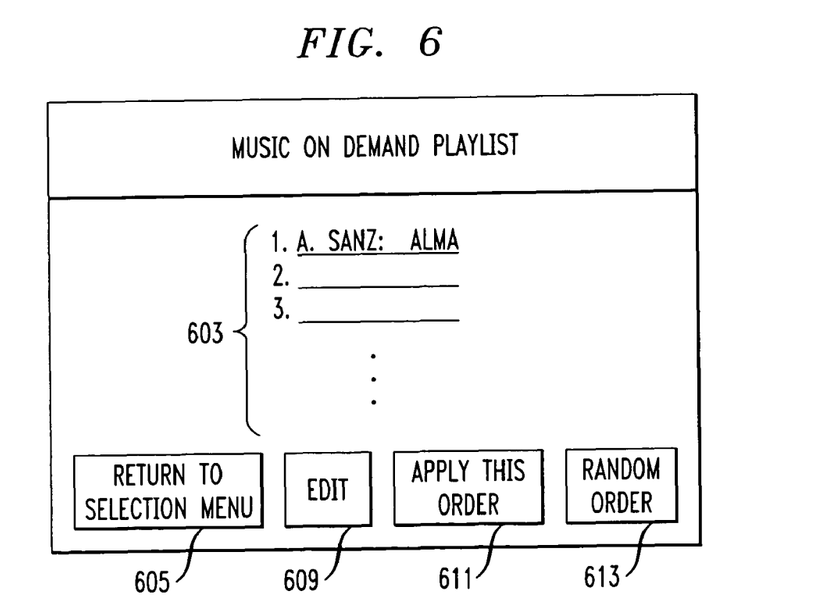
FIG. 6 illustrates a playlist screen in the embodiment, which includes a list of video selections by a user, which are to be played in sequence.

It should be noted at this point that a user may not need to fill a playlist by selecting one music video at a time. Rather, the user may fill a playlist by selecting a category of music video, e.g., music videos featuring a selected artist, music videos belonging to a selected genre, etc. For example, in this embodiment, when Genre option 505 in FIG. 5 is selected, the user is given a choice between "Classic," "Pop," "Hard Rock," "Country," "Gospel," etc. After the user chooses the desired genre, he/she may be given a "Select All" option, which enables the user to place all of the music video selections belonging to the desired genre onto playlist 603. The user may then edit the playlist if so desired.

Figure 7:
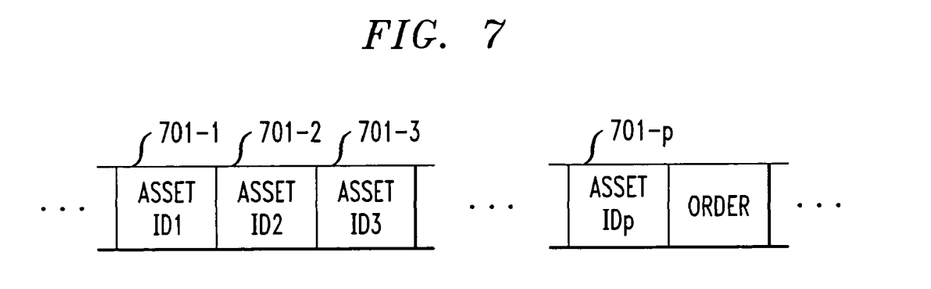
FIG. 7 illustrates a play-video request in the embodiment including identities of the video selections on the list, and an indication of the order in which the video selections to be played.

After the user completes playlist 603 to his/her satisfaction, the user may exercise "Apply this Order" option 611 to have the music video selection played in the order as listed. Alternatively, the user may exercise "Random Order" option 613 to have the listed selections played in random order. Selection of either of options 611 and 613 causes generation of control signals containing a play-video request, which are sent to headend 22 via an RDC channel in accordance with a well known lightweight stream control protocol ("LSCP"). However, as illustrated in FIG. 7, the play-video request here has been modified to include fields 701-1 through 701-$p$ for specifying the respective asset IDs of multiple music video selections specified in playlist 603, where p represents the number of selections on playlist 603. In addition, the request includes Order field 703 for specifying the order in which the music videos are to be played, resulting from a selection of option 611 or 613. For example, a value "0" in field 703 may represent the same order as that of playlist 603, and a "1" value may represent a random order. After VOD server 44 receives the control signals and reads the play-video request therein, it transmits the selected music videos identified in fields 701 to the terminal 18-1 for back-to-back display on device 61, according to the order specified in field 703.

In order for terminal 18-1 to receive the sequence of selected music videos, the terminal is informed by headend 22, through an FDC, the ID of the transport stream (TSID) containing the sequence of music video programs, and the IDs of the programs (PIDs). Accordingly, using the received TSID, terminal 28-1 identifies the appropriate one of the program streams provided to its neighborhood, from which the desired programs are extracted based on the received PIDs.

Figure 8:
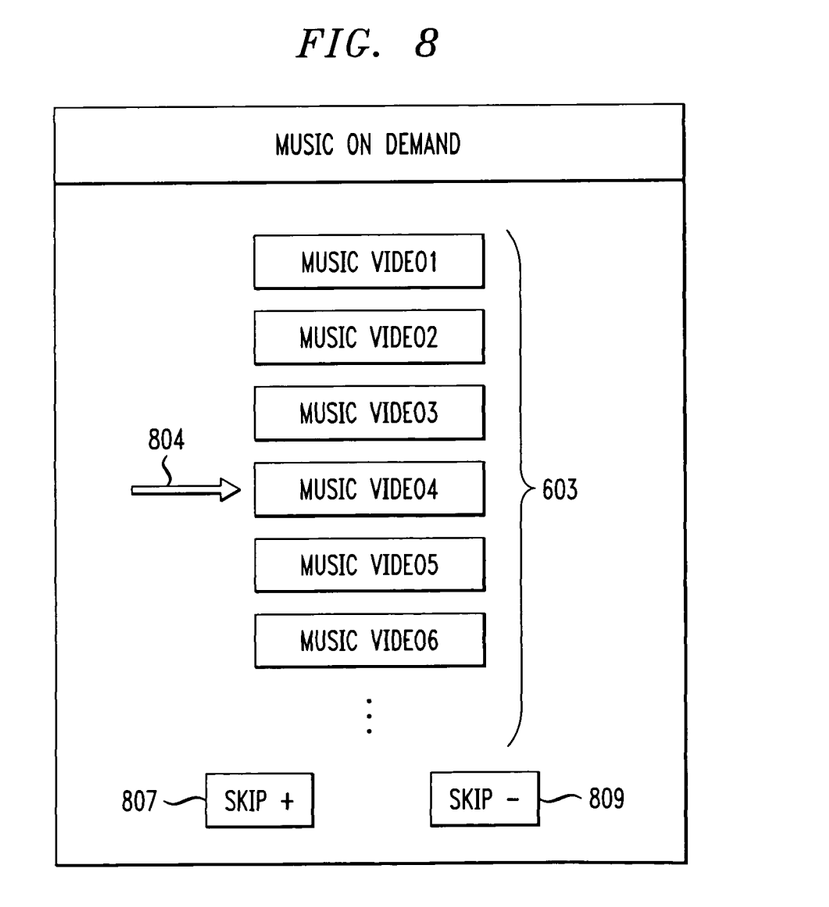
FIG. 8 illustrates a graphical user interface (GUI) whereby a user may skip playing one or more video selections on the list.

In a first embodiment, each music video in the sequence is regarded as an individual program. In this embodiment, when a user while reviewing a program in the sequence presses, e.g., a "Rewind" key (or other predetermined key) on a remote control, playlist 603 is displayed (illustrated in FIG. 8), along with indicator 804 indicating the music video program on the playlist being played (e.g., music video4). The user may then use the remote control to select "Skip +" option 807 to skip forward to view, e.g., music video5, music video6, etc. on the playlist. Conversely, the user may select "Skip –" option 809 to skip backward to view, e.g., music video3, music video2, etc. Continued depression of the Rewind key causes the GUI of FIG. 8 to disappear, and the program under review to be rewound in a conventional manner, e.g., to the beginning of a chapter of the program. However, in this first embodiment, without use of "Skip +" option 807 or "Skip –" option 809, the user cannot rewind or fast-forward past the current program under review.

Nevertheless, in a second embodiment, VOD server 44 treats the sequence of selected music videos as a single composite program, with no regard for delimitation of individual music videos. Thus, in this second embodiment, the user may press the Rewind key or Fast-Forward key to rewind or fast-forward past the current program under review.

The foregoing merely illustrates the principles of the invention. It will thus be appreciated that those skilled in the art will be able to devise numerous other arrangements which embody the principles of the invention and thus are within the spirit and scope of the invention.

For example, in the disclosed embodiment, an MuOD service is illustratively used to demonstrate the invention. However, the invention generally applies to any entertainment service which allows a user to select a program, e.g., an on-demand program, to view.

Finally, system 10 disclosed herein is in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing an on-demand entertainment service over a communications network, the method comprising:

broadcasting data descriptive of a plurality of on-demand programs over the communications network;

receiving a request for playing, in a continuous manner, multiple user selected on-demand programs, said user selected on-demand programs including at least one of a video program or a combined audio video program, the request including at least information identifying the respective selected on-demand programs;

generating a playlist including said multiple user selected on-demand programs, said playlist including individual boundaries between different user selected programs;

indexing said multiple user selected on-demand programs on said playlist as a single program, said single program being a composite program including said multiple user selected on-demand programs and said individual program boundaries, said indexing generating indices including normal play time information, each index including an asset identifier (ID) in addition to a normal play time; and responding to at least one of a fast-forward and rewind request by supplying content in said composite program without regard to individual program boundaries included within the composite program.

2. The method of claim 1 wherein content supplied in response to said at least one of a fast-forward and rewind request spans across the end of one of said selected on-demand programs and the start of another one of said on-demand programs.

3. The method of claim 1,
wherein the order in which said programs are included in said playlist, and thus said composite program, is a random order determined by a sever which receives said request for playing; and
wherein the user device includes a set-top terminal.

4. The method of claim 1 further comprising receiving input indicating user determined order in which the multiple user selected on-demand programs are to be included in said playlist and thus in said composite program.

5. The method of claim 4 wherein the order includes the order in which the on-demand programs are selected.

6. The method of claim 4 wherein the order includes a random order.

7. The method of claim 1 wherein the request includes data specifying the order in which the selected on-demand programs are to be played.

8. The method of claim 1 wherein the communications network includes a broadband communications network.

9. The method of claim 8 wherein the broadband communications network includes a cable network.

10. The method of claim 1 wherein the on-demand entertainment service includes a music on-demand service.

11. The method of claim 10 wherein the selected on-demand programs include at least one music video.

12. A method for receiving on-demand programs from a server through a communications network, comprising:
generating a request for playing, in a continuous manner, on-demand programs on a playlist including multiple user selected on-demand programs, said playlist including individual boundaries between different user selected programs;
receiving from the communications network an identifier identifying a communications stream containing the on-demand programs on the playlist, said on-demand programs on the play list including at least one of a video program or a combined audio video program, the identifier being generated by the server, said on-demand programs on the playlist having been indexed as a single program with multiple indices associated therewith, each index including an asset identifier (ID) in addition to a normal play time, said single program being a composite program including said multiple user selected on-demand programs and said individual program boundaries;
retrieving content of the user selected on-demand programs on the list from the communications stream identified by the identifier;
transmitting one of a rewind and fast forward command to control playback of said composite program; and
receiving content corresponding to said composite program in response to said one of a rewind and fast forward command without regard to individual program boundaries included within said composite program, said content extending across the end of one of said user selected on-demand programs and the start of the other one of said user selected on-demand programs.

13. The method of claim 12 further comprising allowing the user to determine an order in which the on-demand programs on the list are to be played.

14. The method of claim 13 wherein the order includes the order in which the on-demand programs are listed on the list.

15. The method of claim 13 wherein the order includes a random order.

16. The method of claim 12 wherein the communications network includes a broadband communications network.

17. The method of claim 16 wherein the broadband communications network includes a cable network.

18. The method of claim 12 wherein the on-demand entertainment service includes a music on-demand service.

19. The method of claim 18 wherein the on-demand programs on the list include at least one music video including audio and video content.

20. A system for providing an on-demand entertainment service over a communications network, the system comprising:
a mechanism for broadcasting data descriptive of a plurality of on-demand programs, a user being allowed to select ones of the on-demand programs to play based on the data from broadcast;
an interface for receiving a first request for playing, in a continuous manner, multiple user selected on-demand programs included in a playlist including said multiple user selected on-demand programs, said user selected on-demand programs including at least one of a video program or a combined audio video program, said playlist including individual boundaries between different user selected programs, and a second request including a trick play command to manipulate playback of the multiple user selected on-demand programs without regard to said individual boundaries between different user selected programs within said playlist; and
a server for indexing said multiple user selected on-demand programs as a single program, said single program being a composite program including said multiple user selected on-demand programs and said individual program boundaries, and for responding to at least one of a fast-forward and rewind request regarding content included in said composite program by supplying content in said composite program without regard to individual program boundaries within the composite program, said server generating indices including normal play time information, each index including an asset identifier (ID) in addition to a normal play time.

21. The system of claim 20 wherein the user is allowed to determine, prior to said indexing, an order in which the selected on-demand programs are to be played.

22. The system of claim 21 wherein the order includes the order in which the on-demand programs are selected.

23. The system of claim 20 wherein the order of individual selected on-demand programs in said composite program is a random order determined by said server.

24. The system of claim 20 wherein the request includes data specifying the order in which the selected on-demand programs are to be played.

25. The system of claim 20 wherein the communications network includes a broadband communications network.

26. The system of claim 25 wherein the broadband communications network includes a cable network.

27. The system of claim 20 wherein the on-demand entertainment service includes a music on-demand service.

28. The system of claim 27 wherein the selected on-demand programs include at least one music video.

29. A system for receiving on-demand programs from a server through a communications network, comprising:
a mechanism for allowing a user to compile a playlist of multiple user selected on-demand programs to be played, said playlist including individual boundaries between different user selected programs;
a processing unit configured to generate a request for playing, in a continuous manner, the on-demand programs on the playlist;
an interface for receiving from the communications network an identifier identifying a communications stream containing the multiple user selected on-demand programs on the playlist, said on-demand programs on the play list including at least one of a video program or a combined audio video program, said multiple user selected on-demand programs on the playlist having been indexed as a single program with multiple indices associated therewith, each index including an asset identifier (ID) in addition to a normal play time, said single program being a composite program including said multiple user selected on-demand programs and said individual program boundaries, the identifier being generated by the server, content of the multiple user selected on-demand programs on the playlist being retrieved from the communications stream identified by the identifier; and
a communication link for communicating one of a fast-forward and rewind request used to control manipulation of the supply of content corresponding to the composite program without regard to individual program boundaries included within the composite program.

30. The system of claim 29 wherein the user is allowed to determine an order in which the on-demand programs on the list are to be played.

31. The system of claim 30 wherein the order includes the order in which the on-demand programs are listed on the list.

32. The system of claim 30 wherein the order includes a random order.

33. The system of claim 29 wherein the communications network includes a broadband communications network.

34. The system of claim 33 wherein the broadband communications network includes a cable network.

35. The system of claim 29 wherein the on-demand entertainment service includes a music on-demand service.

36. The system of claim 35 wherein the on-demand programs on the list include at least one music video.

37. The method of claim 1, further comprising using said generated indices to perform a trick play operation on said composite program as if it were a single program.

38. The method of claim 1, wherein said multiple user selected on-demand programs are multimedia programs.

39. The method of claim 1, wherein at least one of said multiple user selected on-demand programs is a program which includes audio and video.

40. The method of claim 39, wherein said multiple user selected on demand programs are music videos.

41. The method of claim 39, wherein at least some of said multiple user selected on-demand programs are different lengths.

* * * * *